(12) United States Patent
Nishimura (10) Patent No.: US 6,347,612 B1
(45) Date of Patent: Feb. 19, 2002

(54) CONTROL SYSTEM FOR A DIRECT INJECTION ENGINE OF SPARK IGNITION TYPE

(75) Inventor: Hirofumi Nishimura, Fuchu-cho (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/659,487

(22) Filed: Sep. 11, 2000

(30) Foreign Application Priority Data

Sep. 30, 1999 (JP) .......................................... 11-280622

(51) Int. Cl.⁷ ............................................... F02B 17/00
(52) U.S. Cl. ...................................... 123/295; 123/478
(58) Field of Search .............................. 123/295, 305, 123/478; 60/285

(56) References Cited

U.S. PATENT DOCUMENTS

| | | | | |
|---|---|---|---|---|
| 5,878,711 A | * | 3/1999 | Kamura et al. .............. | 123/295 |
| 6,227,163 B1 | * | 5/2001 | Enoki et al. ................ | 123/295 |
| 6,240,895 B1 | * | 6/2001 | Oder .......................... | 123/295 |
| 6,244,243 B1 | * | 6/2001 | Mamiya et al. ............. | 123/295 |
| 6,247,445 B1 | * | 6/2001 | Langer ...................... | 123/295 |

FOREIGN PATENT DOCUMENTS

JP              60-36720          2/1985

* cited by examiner

*Primary Examiner*—John Kwon
(74) *Attorney, Agent, or Firm*—Nixon Peabody LLP; Donald R. Studebaker (57) ABSTRACT

A control system is adapted for a direct injection engine of spark ignition type provided with an exhaust gas purifying catalyst in an exhaust passage, a fuel injection valve for directly spraying fuel into combustion chambers, a sparking plug having an electrode projecting into the combustion chamber. The control system includes an intake air amount controller for controlling the amount of intake air to be admitted into the combustion chambers, and a fuel injection controller for carrying out stratified combustion in a stratified combustion region set in a low engine load region while carrying out uniform combustion in a uniform combustion region set in a high engine load region. When the intake air amount controller executes a control to reduce the amount of intake air in the stratified combustion region when the engine is warm, and the fuel control system advances the fuel injection starting timing within a compression stroke and sets a degree of advancement within such a range where stratified combustion can be maintained. Accordingly, deterioration of combustibility can be effectively prevented when the intake air amount controller executes the control to reduce the amount of intake air in the stratified combustion region.

11 Claims, 4 Drawing Sheets

CONTROL SYSTEM FOR A DIRECT INJECTION ENGINE OF SPARK IGNITION TYPE

BACKGROUND OF THE INVENTION

This invention relates to a control system for a direct injection engine of spark ignition type mounted in an automotive vehicle or the like.

A control system is disclosed, for example, in Japanese Examined Patent Publication NO. 5-83730. This system is for an stratified charge engine provided with fuel feeders for supplying fuel into combustion chambers to control an output corresponding to a load, ignition devices provided in the combustion chambers, a throttle for controlling an open area of an intake passage without mechanically linking it with an accelerating operation, a catalyst provided in an exhaust passage, an exhaust gas temperature detector for detecting a temperature of an exhaust system, wherein a stratified combustion is carried out by supplying fuel by means of the fuel feeders in such a manner that the fuel is present around the ignition devices for ignition and a lean combustion is carried out by increasing the open area of the intake passage in proportion to the amount of fuel by means of the throttle at least at low engine loads, whereas a uniform combustion is carried out by feeding the fuel into the combustion chambers in a dispersed manner for ignition at high engine loads. This control system is constructed such that the temperature of the catalyst is increased at an earlier stage while suppressing undercooling of the catalyst by reducing the open area of the intake passage by means of the throttle to reduce an amount of intake air when an output of the exhaust gas temperature detector indicates that the temperature of the exhaust system has fallen to or below a set value.

The above construction in which the amount of intake air is reduced by narrowing the intake passage by the throttle when the exhaust gas temperature is low has an advantage that undercooling of the catalyst for purifying the exhaust gas can be suppressed by preventing a fall of the exhaust gas temperature through admission of a larger amount of intake air into the combustion chambers. However, this construction has a problem that deterioration of combustibility is unavoidable if a control is executed to reduce the amount of intake air in a stratified combustion region since an air-fuel mixture around electrodes of a sparking plug tend to be excessively enriched.

More specifically, in the stratified combustion region of the engine, a pumping loss has been conventionally reduced by increasing an opening of a throttle valve to a larger extent than necessary in order to provide an engine output required according to an operating condition. Particularly, in an idle operating condition where a small amount of intake air is required to provide an engine output, since the opening of the throttle valve can be excessively increased beyond a value corresponding to a necessary amount of intake air, there is an advantage that a pumping loss can be significantly reduced while maintaining combustibility at a proper level by setting an amount of fuel to be sprayed and a fuel injection timing such that a stratus of air-fuel mixture of a proper concentration is formed around the electrodes of the sparking plug. However, if the amount of intake air is reduced by controlling the throttle valve in order to suppress undercooling of the exhaust gas purifying catalyst in the idle operating condition of the engine, it is an unavoidable problem that the air-fuel mixture present around the electrodes of the sparking plug is excessively enriched.

SUMMARY OF THE INVENTION

It is an object of the present invention to provide a control system for a direct injection engine of spark ignition type which is free from the problems residing in the prior art.

According to an aspect of the invention, a control system for a direct injection engine of spark ignition type which is provided with an exhaust gas purifying catalyst provided in an exhaust passage, a fuel injection valve for directly spraying fuel into a combustion chamber, a sparking plug having an electrode projecting into the combustion chamber, the control system comprises an intake air amount controller for controlling the amount of intake air to be admitted into the combustion chamber, and a fuel injection controller for carrying out stratified combustion in a stratified combustion region set in a low engine load region when the engine is warm while carrying out uniform combustion in a uniform combustion region set in the high engine load region. When the intake air amount controller executes the control to reduce the amount of intake air in the stratified combustion region when the engine is warm, the fuel injection controller advances the fuel injection starting timing within the compression stroke and sets a degree of advancement in such a range where the stratified combustion of the engine can be maintained.

Accordingly, stratified combustion can be maintained when the control to reduce the amount of intake air in the stratified combustion region is executed in order to, for example, prevent a fall in exhaust gas temperature, thereby advantageously maintaining combustibility at a satisfactory level while preventing the air-fuel ratio from decreasing.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS OF THE INVENTION

Figure 1:
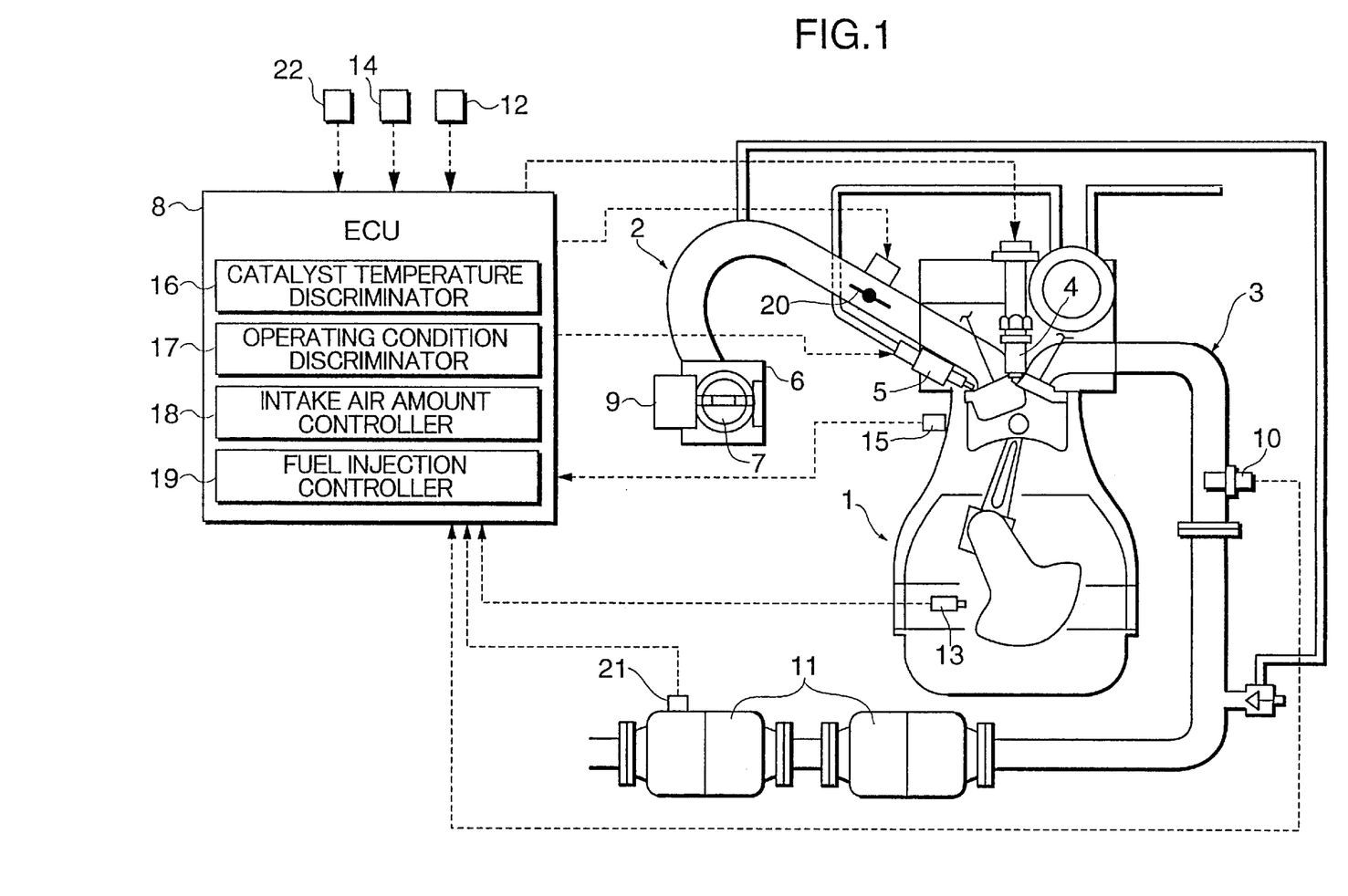
FIG. 1 is a diagram showing a control system for a direct injection engine of spark ignition type according to an embodiment of the invention.

FIG. 1 is a diagram showing one embodiment of a control system for a direct injection engine of spark ignition type according to the invention. This control system is provided with an intake passage 2 and an exhaust passage 3 connected with a main engine unit 1 of a gasoline engine to spray fuel into cylinders which engine is mounted in an automotive vehicle, sparking plugs 4 mounted at the top of the respective combustion chambers of the main engine unit 1 in such a manner as to project into the combustion chambers, and fuel injection valves 5 for directly spraying fuel into the corresponding combustion chambers.

A surge tank 6 is provided in the intake passage 2, and a throttle valve 7 is provided upstream from the surge tank 6. The throttle valve 7 is driven to open and close by an electrical actuator 9 which operates in response to a control signal outputted from an engine control unit (ECU) 8, thereby displaying a function as an intake air amount controller for regulating an amount of intake air.

The intake passage 2 is branched downstream from the surge tank 6 into branch pipes individually extending to the respective cylinders, and two passages (only one passage is shown in FIG. 1) is defined in each branch pipe. Two intake ports at the downstream ends of the two passages communicate with the corresponding combustion chamber, and a swirl control valve 20 as a gas flow reinforcing device is provided in one of the two passages. During the stratified combustion of the engine, a swirl is generated in the combustion chamber by an intake air admitted into the combustion chamber through the other passage by closing the swirl control valve 20, thereby reinforcing a gas flow in the combustion chamber.

An $O_2$ sensor 10 for detecting an air-fuel ratio of an exhaust gas is provided in the exhaust passage 3, and an exhaust gas purifying catalyst 11 for purifying the exhaust gas is provided in a downstream position of the upstream exhaust passage 3 connected with an exhaust manifold of the engine. The catalyst 11 may be a three way catalyst. However, it is desirable to use a catalyst which can effectively purify NOx even under a lean condition where an air-fuel ratio is larger than a stoichimetric air-fuel ratio in order to improve a purifying performance in the case of a stratified operation by increasing the air-fuel ratio after the warming-up of the engine.

The engine is provided with various sensors including an air flow sensor 12 for detecting an amount of intake air passing through the intake passage 2, a crank angle sensor 13 for detecting an engine speed, an acceleration pedal travel sensor 14 and an engine water temperature sensor 15. Detection signals of these sensors are inputted to the engine control unit 8.

The engine control unit 8 is provided with a catalyst temperature judger 16 for judging a temperature condition of the catalyst 11, an operating condition judger 17 for judging an operating condition of the engine, an intake air amount controller 18 for controlling an amount of intake air admitted into the combustion chambers by controlling the opening of the throttle valve 7, and a fuel injection controller 19 for controlling an amount of fuel to be sprayed and an injection timing.

The catalyst temperature judger 16 is so constructed as to confirm whether the catalyst 11 is in an easy-to-inactivate state by judging whether the catalyst 11 has such a low temperature equal to or below a predetermined temperature in accordance with the detection signal of the catalyst temperature sensor 21. Alternatively, the temperature condition of the catalyst 11 may be estimated in accordance with the detection signal of the engine water temperature sensor 15 or in accordance with the detection value of the sensor 15 and a lapse of time after the start of the engine.

The operating condition judger 17 judges whether the present operating condition of the engine lies in an operating region A where engine load and speed are low or in an operating region B where at least either engine load or engine speed is higher than that of the operating region A based on an engine speed detected by the crank angle sensor 13 and an engine load detected by the acceleration pedal travel sensor 14. The judgment result is outputted to the intake air amount controller 18 and the fuel injection controller 19.

The intake air amount controller 18 is constructed to output a control signal for reducing the amount of intake air admitted into the combustion chambers to a level lower than a usual one by driving the throttle valve 7 to close it in the case that the catalyst temperature judger 16 confirms that the temperature of the catalyst 11 is equal to or below the predetermined temperature in the stratified combustion region where fuel injection is performed during a compression stroke as described later.

The fuel injection controller 19 reads a target torque of the engine from a map defined in advance based on the engine speed detected by the crank angle sensor 13 and the travel of the acceleration pedal detected by the sensor 14, reads a target fuel injection amount from a map defined in advance based on the read target torque and an actual amount of intake air detected by the air flow sensor 7, and outputs a control signal corresponding to this target fuel injection amount to the fuel injection valve 5.

Further, the fuel injection controller 19 sets an optimal fuel injection timing according to the operating condition of the engine judged by the operating condition judger 17 and controls a fuel injection timing based on the optimal fuel injection timing during a usual operation period of the engine.

Figure 2:
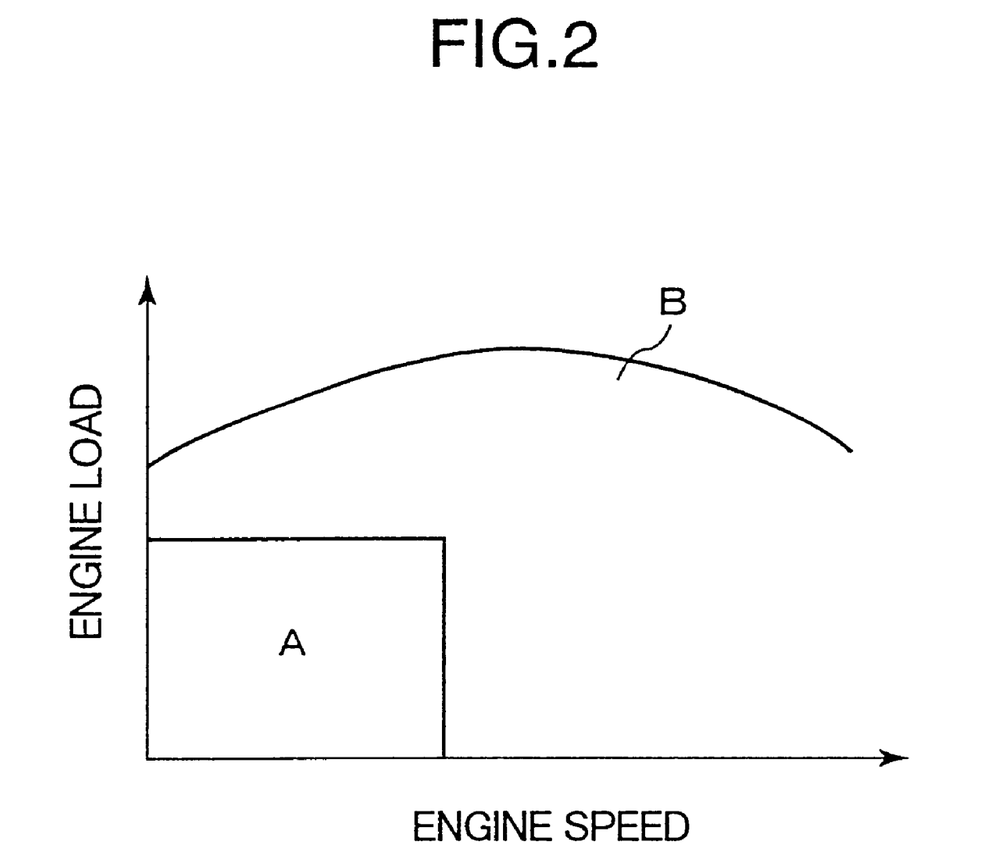
FIG. 2 is a graph showing operating regions of the engine.

Specifically, as shown in FIG. 2, if the operating condition of the engine lies in the stratified combustion region A when the engine is warm, the fuel injection controller 19 executes a control to carry out stratified combustion by spraying the fuel all at once during a compression stroke to form a stratus of relatively rich air-fuel mixture around the electrodes of the sparking plug 4. Further, if the operating condition of the engine lies in the uniform combustion region B when the engine is warm, the fuel injection controller 19 executes a control to carry out uniform combustion by spraying the fuel all at once during an intake stroke to distribute the stratus of rich air-fuel mixture in the combustion chamber.

Further, the fuel injection controller 19 sets a fuel injection starting timing earlier than an optimal injection timing set for a usual time in the second half of the compression stroke, i.e., within a range between 90° before top dead center and top dead center of the compression stroke under the condition that the air-fuel ratio in the exhaust gas is larger than the stoichimetric air-fuel ratio when the temperature of the exhaust gas purifying catalyst 11 is confirmed to be low by the catalyst temperature judger 16 and a control to reduce the amount of intake air is executed by the intake air amount controller 18 in the stratified combustion region when the engine is warm.

Figure 3:
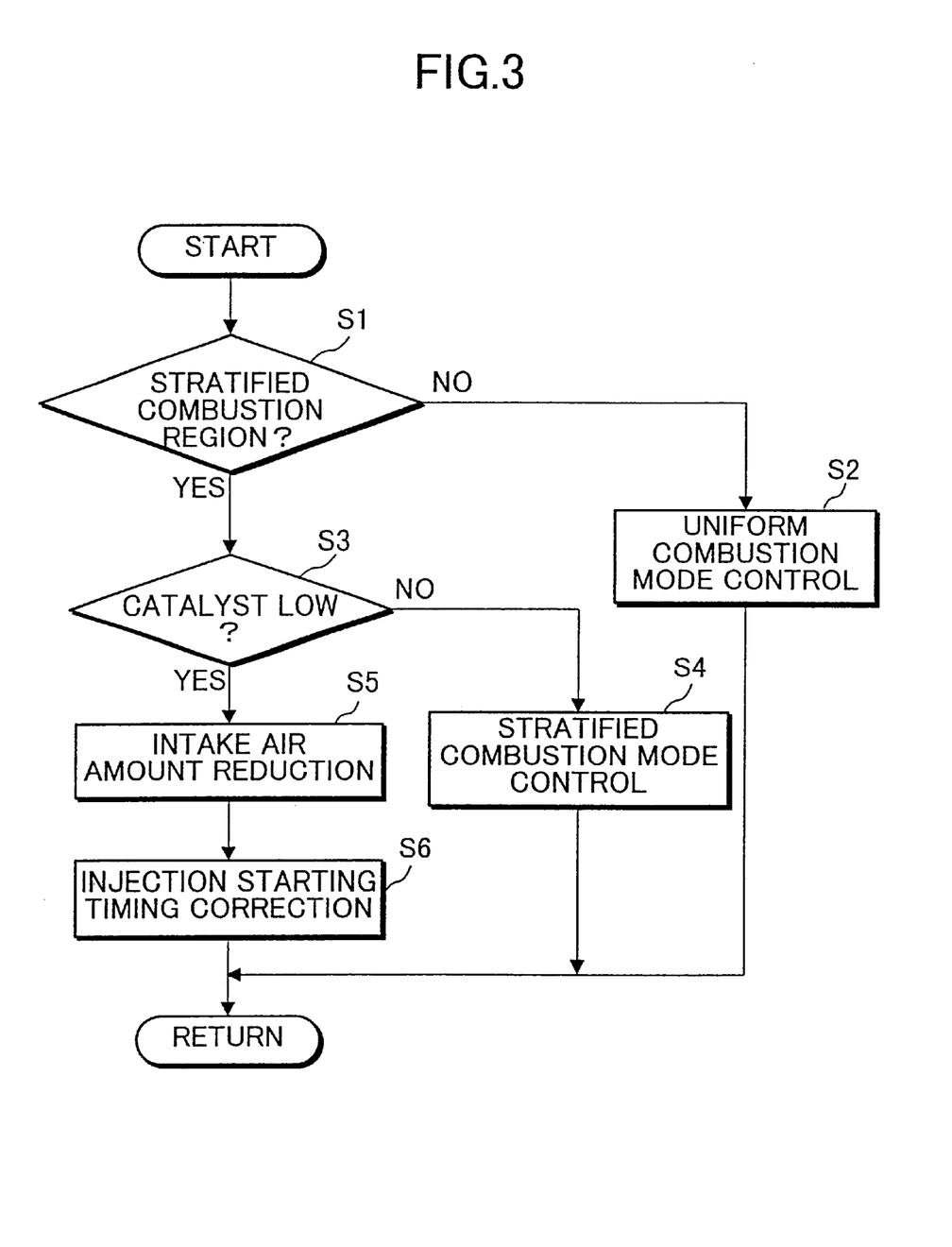
FIG. 3 is a flowchart showing a control operation executed by the control system.

A control executed in the control system for the direct injection engine of spark ignition type is described with reference to a flowchart shown in FIG. 3. Upon the start of the control, the operating condition judger 17 judges whether the operating condition of the engine lies in the low engine load/low engine speed region, i.e., in the stratified combustion region A shown in FIG. 2 in accordance with the detection signals of the crank angle sensor 13 and the acceleration pedal travel sensor 14 when the engine is warm (Step S1). If the operating condition of the engine is confirmed to lie in the uniform combustion region B (NO in Step S1), a uniform combustion mode control is executed to spray the fuel during the intake stroke (Step S2).

If the operating condition of the engine is confirmed to lie in the stratified combustion region A (YES in Step S1), the catalyst temperature judger 16 judges whether the temperature of the catalyst 11 is a predetermined temperature or below in accordance with the detection signal of the catalyst temperature sensor 21 (Step S3). If the judgment result is negative, a stratified combustion mode control is executed to spray the fuel during the compression stroke (Step S4).

On the other hand, if the temperature of the catalyst 11 is confirmed to be low in the stratified combustion region A when the engine is warm (YES in Step S3), the intake air amount controller 18 conducts such a correction as to reduce the amount of intake air (Step S5) and the fuel injection controller 19 conducts such a correction as to set the fuel injection starting timing earlier than the one set for the usual operation period in the second half of the compression stroke (Step S6).

In the control system for the direct injection engine of spark ignition type constructed such that the operating region of the engine is divided into the stratified combustion region in a low engine load region and the uniform combustion region in a high engine load region, and the fuel is sprayed during the compression stroke in the former region while being sprayed during the intake stroke in the latter region, the fuel injection controller 19 sets the fuel injection starting timing earlier than the one set for the usual operation period in the second half of the compression stroke when the intake air amount controller 18 executes the control to reduce the amount of intake air in the stratified combustion region when the engine is warm. Accordingly, during the execution of the above control to reduce the amount of intake air in the stratified combustion region, for example, to prevent a fall in exhaust gas temperature, combustibility can be maintained at a satisfactory level while the air-fuel ratio is prevented from decreasing by maintaining stratified combustion.

Specifically, if the control to reduce the amount of intake air is executed by closing the throttle valve 7 in the stratified combustion region where a large amount of intake air is admitted into the combustion chamber by increasing the opening of the throttle valve 7 and an increase of the air-fuel ratio in the entire combustion chamber is prevented by concentrating a fuel-air mixture of a suitable concentration around the electrodes of the sparking plug 4, thereby maintaining combustibility at a satisfactory level, the air-fuel mixture tends to be excessively enriched around the electrodes of the sparking plug 4 to degrade combustibility. If the control to advance the fuel injection starting timing by a specified amount during the compression stroke is executed in such a case, a time to sufficiently vaporize and atomize the fuel can be ensured, and combustibility can be maintained at a satisfactory level by preventing the enrichment of the air-fuel mixture around the electrodes of the sparking plug 4.

Accordingly, a fall in exhaust gas temperature resulting from an excessive amount of intake air can be prevented by executing the control to reduce the amount of intake air in the stratified combustion region as in this embodiment, in the case that the catalyst temperature judger 16 of the engine control unit 8 confirms the temperature of the catalyst 11 to be low in accordance with the detection signal of the catalyst temperature sensor 21. This enables the catalyst 11 to maintain its exhaust gas purifying performance at a suitable level while preventing it from being inactivated.

Further, in this embodiment, stratified combustion is maintained by the fuel injection controller 19 setting the fuel injection starting timing earlier than an optimal injection timing set for the usual operation period in the second half of the compression stroke, i.e., between 90° before top dead center and top dead center of the compression stroke when the intake air amount controller 18 executes the control to reduce the amount of intake air in the stratified combustion region when the engine is warm. Accordingly, combustibility can be maintained at a satisfactory level while preventing an impairment of a fuel consumption improving effect.

If a control is executed to reduce the air-fuel ratio in the entire combustion chamber to a value larger than the stoichiometric air-fuel ratio when the intake air amount controller 18 executes the control to reduce the amount of intake air in the stratified combustion region when the engine is warm, a decrease of the air-fuel ratio in the entire combustion chamber can be prevented by maintaining the stratified combustion. Therefore, both fuel consumption and combustibility can be maintained at satisfactory levels.

The advancement degree of the fuel injection starting timing is not limited to the one of this embodiment provided that it is in such a range where the stratified combustion of the engine can be maintained. For instance, stratified combustion may be maintained by advancing the fuel injection starting time during a period between the middle phase of the compression stroke and the final phase thereof, i.e., in a range between 120° before top dead center and 60° before top dead center of the compression stroke.

Instead of the foregoing embodiment which is constructed such that the amount of intake air is reduced if the catalyst temperature judger 16 of the engine control unit 8 confirms the temperature of the catalyst 11 to be low in accordance with the detection signal of the catalyst temperature sensor 21 in the stratified combustion region when the engine is warm, the intake air amount controller 18 executes the control to reduce the amount of intake air in the stratified combustion region if the operating condition judger 17 confirms the engine to be in an idle operating condition.

For instance, the operating condition judger 17 of the engine control unit 8 may judge whether the engine has continued to be in the idle operating condition over a predetermined time, e.g., 2 min. in accordance with the detection signals of the crank angle sensor 13 and the acceleration pedal travel sensor 14, and the intake air amount controller 18 may execute the control to reduce the amount of intake air in the stratified combustion region if the engine is confirmed to have been in the idle operating condition over the predetermined time. Alternatively, whether the engine is in the idle operating condition may be directly judged in accordance with the detection signal of the crank angle sensor 13.

In the case of such a construction, upon confirming in accordance with the detection signal of, e.g., the crank angle sensor 13 that the catalyst 11 is in an easy-to-inactivate state due to a fall in exhaust gas temperature by continuous operation of the engine in the low engine load region such as the idle condition in the stratified combustion region when the engine is warm, the intake air amount controller 18 executes the control to reduce the amount of intake air and the fuel injection controller 19 advances the fuel injection timing by a specified amount during the compression stroke. Thus, combustibility can be maintained at a satisfactory level by preventing a fall in exhaust gas temperature due to an excessive amount of intake air while preventing the catalyst 11 from becoming inactive.

Further, uniform combustion in which the fuel injection is started during the intake stroke may be carried out in the case that the operating condition judger 17 confirms the engine to be in the low engine load region such as the idle operating region and an outside air temperature detector for detecting an outside air temperature confirms the outside air temperature to be low in the stratified combustion region when the engine is warm. In other cases, the intake air amount controller 18 may execute the control to reduce the amount of intake air and the fuel injection controller 19 may execute the control to advance the fuel injection timing during the compression stroke.

Figure 4:
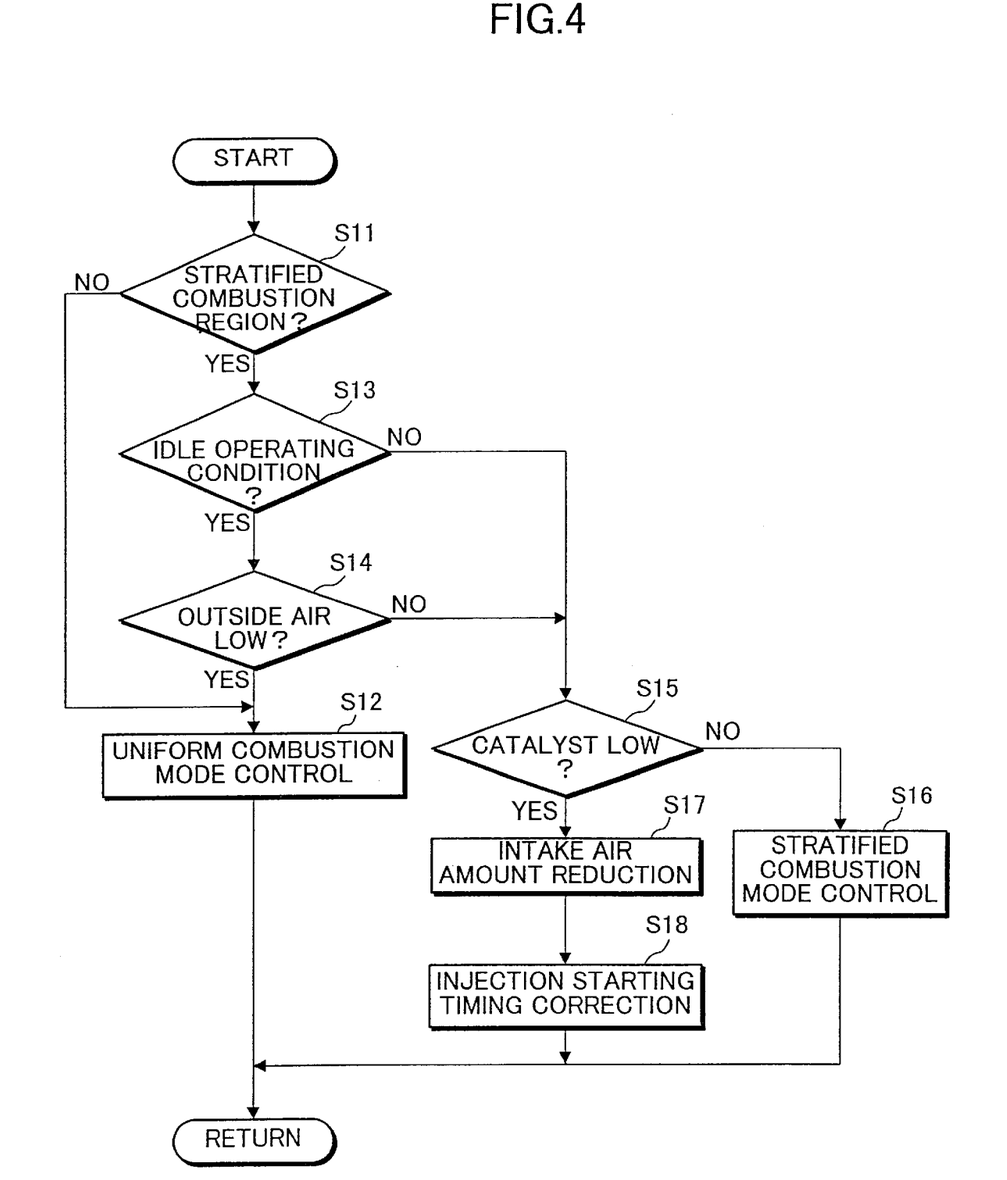
FIG. 4 is a flowchart showing another control operation executed by the control system.

Specifically, as shown in FIG. 4, the operating condition judger 17 judges whether the operating condition of the engine being warm lies in the stratified combustion region A in accordance with the detection signals of the crank angle sensor 13 and the acceleration pedal travel sensor 14 (Step S11). If the operating condition of the engine is confirmed to lie in the uniform combustion region B (NO in Step S11), the uniform combustion mode control to spray the fuel during the intake stroke is executed (Step S12).

If the operating condition of the engine is confirmed to lie in the stratified combustion region A (YES in Step S11), it is judged whether the engine is in the idle operating condition (Step S13). If the judgment result in Step S13 is positive, it is judged whether the outside air temperature is lower than a predetermined value (Step S14).

If the engine is confirmed to be in the idle operation condition and the outside air temperature is confirmed to be low (YES in Steps S13 and S14), this routine proceeds to Step S12 in which the fuel is sprayed during the intake stroke and the uniform combustion mode control is executed to set the air-fuel ratio of the entire combustion chamber substantially equal to the stoichiometric air-fuel ratio.

If the judgment result is negative in either S13 or S14, the catalyst temperature judger 16 judges whether the temperature of the catalyst 11 is lower than a predetermined value in accordance with the detection signal of the catalyst temperature sensor 21 (Step S15). If the judgment result in Step S15 is negative, the stratified combustion mode control is executed to spray the fuel during the compression stroke (Step S16).

On the other hand, if the temperature of the catalyst 11 is confirmed to be low in the stratified combustion while the engine is low (YES in Step S15), the intake air amount controller 18 performs a correction to reduce the amount of intake air (Step S17) and the fuel injection controller 19 performs a correction to advance the fuel injection starting timing from the one set for the usual operation period in the second half of the compression stroke (Step S18).

The exhaust gas temperature can be effectively increased if uniform combustion is carried out to start the fuel injection during the intake stroke when the operating condition judger 17 confirms the engine to be in the low engine load region such as the idle operating region and the outside air temperature detector confirms the outside air temperature to be low in the stratified combustion region when the engine is warm. This securely prevents the catalyst 11 from becoming inactive due to a low temperature thereof.

Further, the exhaust gas temperature can be effectively increased while preventing the air-fuel ratio from decreasing by maintaining the combustibility of the engine at a proper level in the case that the fuel is sprayed during the intake stroke and the amount of intake air is so controlled as to set the air-fuel ratio in the entire combustion chamber substantially equal to the stoichiometric air-fuel ratio when the operating condition of the engine is confirmed to lie in the low engine load region and the outside air temperature is confirmed to be low.

Although the amount of intake air is reduced if the catalyst temperature judger 16 confirms the temperature of the catalyst 11 to be low in Step S15 of the flowchart shown in FIG. 4 in the foregoing embodiment, the intake air amount controller 18 may execute the control to reduce the amount of intake air when the operating condition judger 17 confirms the engine to have been in the idle operating condition over a predetermined time, e.g., 2 min.

If the catalyst 11 is provided in a downstream position of the upstream exhaust passage 3 connected with the exhaust manifold of the engine as in the foregoing embodiment, it causes a problem that the catalyst 11 is easy to inactivate due to a fall in exhaust gas temperature as compared to the case where it is provided in an upstream position of the exhaust passage 3. Thus, significant effects can be brought about by advancing the fuel injection starting timing within the compression stroke and setting the degree of advancement within such a range where stratified combustion can be maintained when the intake air amount controller 18 executes the control to reduce the amount of intake air in the stratified combustion region when the engine is warm.

Although the amount of intake air admitted into the combustion chambers is controlled by regulating the opening of the throttle valve 7 by means of the intake air amount controller 18 in the foregoing embodiment, it may be controlled by regulating an opening of an idle speed control valve provided in a bypass pipe bypassing the intake passage 2 or regulating a valve timing by a valve timing regulating device (VVT).

As described above, an inventive control system for a direct injection engine of spark ignition type provided with an exhaust gas purifying catalyst in an exhaust passage, a fuel injection valve for directly spraying fuel into a combustion chamber, a sparking plug having an electrode projecting into the combustion chamber, comprises an intake air amount controller for controlling the amount of intake air to be admitted into the combustion chamber, and a fuel injection controller for forming a stratus of relatively rich air-fuel mixture around the electrodes of the sparking plug at the time of ignition by spraying the fuel during a compression stroke in a stratified combustion region set in a low engine load region when the engine is warm while dispersing the stratus of the rich air-fuel mixture in the combustion chamber by spraying the fuel during an intake stroke in a uniform combustion region in a high engine load region, and advancing the fuel injection starting timing within the compression stroke and sets a degree of advancement in a range where the stratified combustion of the engine can be maintained when the intake air amount controller executes a control to reduce the amount of intake air in the stratified combustion region when the engine is warm.

With this construction, when the intake air amount controller executes the control to reduce the amount of intake air in the stratified combustion region when the engine is warm in order to, for example, prevent the exhaust gas purifying catalyst from becoming inactive by, e.g., increasing the exhaust gas temperature, the fuel injection controller executes the control to advance the fuel injection starting timing by a specified amount within the compression stroke. This prevents the air-fuel mixture around the electrodes of the sparking plug to be excessively enriched while maintaining the stratified combustion of the engine, with the result that combustibility can be maintained at a satisfactory level.

Preferably, the fuel injection controller may be made to advance the fuel injection starting timing within the second half of the compression stroke when the intake air amount controller executes the control to reduce the amount of intake air at least in an idle operating region of the stratified combustion region when the engine is warm.

With this construction, when the intake air amount controller executes the control to reduce the amount of intake air at least in the idle operating region of the stratified combustion region when the engine is warm, the fuel injection controller executes the control to advance the fuel injection starting timing by a specified amount within the latter half of the compression stroke. Th is prevents the air-fuel mixture around the electrodes of the sparking plug to be excessively enriched while maintaining the stratified combustion of the engine, with the result that combustibility can be maintained at a satisfactory level.

Preferably, the degree by which the amount of intake air is reduced may be so controlled as to set an air-fuel ratio in the entire combustion chamber larger than a stoichimetric air-fuel ratio when the intake air amount controller executes the control to reduce the amount of intake air at least in an idle operating region of the stratified combustion region when the engine is warm.

With this construction, when the intake air amount controller executes the control to reduce the amount of intake air in the stratified combustion region when the engine is warm in order to, for example, prevent a fall in exhaust gas temperature, the fuel injection controller advances the fuel injection starting timing by a specified amount within the compression stroke, and the degree by which the amount of intake air is reduced is so controlled as to set the air-fuel ratio in the entire combustion chamber larger than the stoichimetric air-fuel ratio. Thus, the stratified combustion of the engine can be maintained, thereby maintaining combustibility at a satisfactory level while improving fuel consumption.

Preferably, the control system may be further provided with a catalyst temperature judger for judging whether the temperature of the exhaust gas purifying catalyst is low, and the intake air amount controller executes the control to reduce the amount of intake air when the catalyst temperature detector detects the temperature of the exhaust gas purifying catalyst to be low in the stratified combustion region when the engine is warm.

With this construction, the intake air amount controller executes the control to reduce the amount of intake air when the catalyst temperature detector detects the temperature of the exhaust gas purifying catalyst to be low in the stratified combustion region when the engine is warm. Thus, a fall in exhaust gas temperature resulting from an excessive amount of intake air admitted into the combustion chamber can be prevented, which effectively prevents the exhaust gas purifying catalyst from becoming inactive.

Preferably, the control system may be further provided with an operating condition judger for judging whether the engine is in an idle operating condition, and the intake air amount controller executes the control to reduce the amount of intake air when the operating condition judger judges the engine to have continued is in an idle operating condition over a predetermined time in the stratified combustion region when the engine is warm.

With this construction, the intake air amount controller executes the control to reduce the amount of intake air when the operating condition judger judges the engine to have continued is in the idle operating condition over the predetermined time, i.e., confirms a tendency of the exhaust gas purifying catalyst to become inactive, in the stratified combustion region when the engine is warm. Thus, a fall in exhaust gas temperature resulting from an excessive amount of intake air admitted into the combustion chamber can be prevented, which effectively prevents the exhaust gas purifying catalyst from becoming inactive.

Preferably, the control system may be further provided with an operating condition judger for judging whether the engine is in a low engine load region and an outside air temperature detector for detecting an outside air temperature. The intake air amount controller executes control to start fuel injection during the intake stroke when the operating condition judger judges that the engine lies in a low engine load region and the outside air temperature detector detects the outside air temperature is low in the stratified combustion region when the engine is warm.

With this construction, the exhaust gas purifying catalyst is thought to be low, i.e., in an easy-to-inactivate state when the operating condition judger judges that the operating condition of the engine lies in the low engine load region and the outside air temperature detector detects the outside air temperature to be low in the stratified combustion region when the engine is warm. Thus, if the fuel injection controller starts the fuel injection during the intake stroke to carry out uniform combustion, the exhaust gas temperature is effectively increased, thereby effectively preventing the exhaust gas purifying catalyst from becoming inactive.

Preferably, the fuel injection controller may start the fuel injection during the intake stroke and controls the amount of intake air to set an air-fuel ratio in the entire combustion chamber substantially equal to a stoichimetric air-fuel ratio when the operating condition judger judges that the operating condition of the engine lies in a low engine load region and the outside air temperature detector detects the outside air temperature to be low in the stratified combustion region when the engine is warm.

With this construction, the control to start the fuel injection during the intake stroke and the control to set the air-fuel ratio in the combustion chamber substantially equal to the stoichimetric air-fuel ratio are executed when the operating condition judger judges that the operating condition of the engine lies in the low engine load region and the outside air temperature detector detects the outside air temperature to be low in the stratified combustion region when the engine is warm. This can ensure a proper state of combustion, thereby effectively increasing the exhaust gas temperature while preventing the air-fuel ratio from decreasing.

Another inventive control system for a direct injection engine of spark ignition type provided with an exhaust gas purifying catalyst in an exhaust passage, a fuel injection valve for directly spraying fuel into a combustion chamber, a sparking plug having an electrode projecting into the combustion chamber, the control system comprises an intake air amount controller for controlling the amount of intake air to be admitted into the combustion chamber, an operating condition judger for judging whether the engine is in an idle operating condition, and a fuel injection controller for controlling the fuel spraying state of the fuel injection valve. The fuel injection controller is adapted to form a stratus of relatively rich air-fuel mixture around the electrodes of the sparking plug at the time of ignition by spraying the fuel during a compression stroke in a stratified combustion region set in a low engine load region when the engine is warm while dispersing the stratus of the rich air-fuel mixture in the combustion chamber by spraying the fuel during an intake stroke in a uniform combustion region set in a high engine load region. The intake air controller executes a control to reduce the amount of intake air, the fuel injection controller executes a control to advance the fuel injection starting timing within the intake stroke and a control to set the degree of advancement in a range where the stratified combustion can be maintained, and the degree by which the amount of intake air is reduced is so controlled as to set an air-fuel ratio in the entire combustion chamber larger than a stoichimetric air-fuel ratio when the operating condition judger judges that the engine to have continued is in an idle operating condition over a predetermined time in the stratified combustion region when the engine is warm.

With this construction, when the operating condition judger judges the engine to have continued is in the idle operating condition over the predetermined time in the stratified combustion region when the engine is warm, the intake air amount controller executes the control to reduce the amount of intake air in the stratified combustion region and the fuel injection controller executes the control to advance the fuel injection starting timing by a specified amount in order to prevent the exhaust gas purifying catalyst from becoming inactive by increasing the exhaust gas temperature. Further, the degree by which the amount of intake air is reduced is so controlled as to set the air-fuel ratio in the entire combustion chamber larger than the stoichimetric air-fuel ratio. This prevents the air-fuel mixture around the electrodes of the sparking plug to be excessively enriched while maintaining the stratified combustion of the engine, with the result that combustibility can be maintained at a satisfactory level.

Another inventive control system for a direct injection engine of spark ignition type provided with an exhaust gas purifying catalyst in an exhaust passage, a fuel injection valve for directly spraying fuel into a combustion chamber, a sparking plug having an electrode projecting into the combustion chamber, the control system comprises an intake air amount controller for controlling the amount of intake air to be admitted into the combustion chamber, a catalyst temperature judger for judging whether the temperature of the exhaust gas purifying catalyst is low, and a fuel injection controller for controlling the fuel spraying state of the fuel injection valve. The fuel injection controller is adapted to form a stratus of relatively rich air-fuel mixture around the electrodes of the sparking plug at the time of ignition by spraying the fuel during a compression stroke in a stratified combustion region set in a low engine load region when the engine is warm while dispersing the stratus of the rich air-fuel mixture in the combustion chamber by spraying the fuel during an intake stroke in a uniform combustion region set in a high engine load region. The intake air controller executes a control to reduce the amount of intake air, the fuel injection controller executes a control to advance the fuel injection starting timing within the intake stroke and a control to set the degree of advancement in a range where the stratified combustion can be maintained, and the amount by which the amount of intake air is reduced is so controlled as to set an air-fuel ratio in the entire combustion chamber larger than a stoichimetric air-fuel ratio when the catalyst temperature judger judges that the temperature of the exhaust gas purifying catalyst is low in the stratified combustion region when the engine is warm.

With this construction, when the catalyst temperature judger judges that the temperature of the exhaust gas purifying catalyst is low in the stratified combustion region when the engine is warm, the intake air amount controller executes the control to reduce the amount of intake air to thereby suppress a fall in exhaust gas temperature resulting from an excessive amount of intake air admitted into the combustion chamber and effectively prevent the exhaust gas purifying catalyst from becoming inactive. Further, in addition to the intake air amount reduction control, the fuel injection controller executes the control to advance the fuel injection starting timing by a specified amount during the compression stroke, and the degree by which the amount of intake is reduced is so controlled as to set the air-fuel ratio in the entire combustion chamber larger than the stoichimetric air-fuel ratio. This prevents the air-fuel mixture around the electrodes of the sparking plug to be excessively enriched while maintaining the stratified combustion of the engine, with the result that combustibility can be maintained at a satisfactory level.

Still another inventive control system for a direct injection engine of spark ignition type provided with an exhaust gas purifying catalyst in an exhaust passage, a fuel injection valve for directly spraying fuel into a combustion chamber, a sparking plug having an electrode projecting into the combustion chamber, a throttle valve for regulating an amount of intake air to be admitted into the combustion chamber, a crank angle sensor for detecting an engine speed, and an engine control unit for controlling the fuel injection valve and the throttle valve such that a stratus of relatively rich air-fuel mixture is formed around the electrodes of the sparking plug at the time of ignition by spraying the fuel during a compression stroke in a stratified combustion region set in a low engine load region when the engine is warm and the stratus of the rich air-fuel mixture is dispersed in the combustion chamber by spraying the fuel during an intake stroke in a uniform combustion region set in a high engine load region. The starting timing of the fuel injection by the fuel injection valve is advanced within the compression stroke by reducing the amount of intake air. The degree of advancement is set in a range where the stratified combustion can be maintained. The fuel injection valve and the throttle valve are controlled such that the air-fuel ratio in the combustion chamber is larger than a stoichimetric air-fuel ratio when it is confirmed that the idle operating condition of the engine has been continued over a predetermined time in accordance with a detection signal of the crank angle sensor in the stratified combustion region when the engine is warm.

With this construction, when it is confirmed that the idle operating condition of the engine has been continued over the predetermined time in accordance with the detection signal of the crank angle sensor in the stratified combustion region when the engine is warm, the engine control unit executes the control to reduce the amount of intake air in the stratified combustion region, the control to advance the fuel injection starting timing by a specified amount during the compression stroke and the control to set the air-fuel ratio in the entire combustion chamber larger than the stoichimetric air-fuel ratio. This prevents the air-fuel mixture around the electrodes of the sparking plug to be excessively enriched while maintaining the stratified combustion of the engine, with the result that combustibility can be maintained at a satisfactory level.

Yet another inventive control system for a direct injection engine of spark ignition type provided with an exhaust gas purifying catalyst in an exhaust passage, a fuel injection valve for directly spraying fuel into a combustion chamber, a sparking plug having an electrode projecting into the combustion chamber, a catalyst temperature sensor for detecting a temperature of the exhaust gas purifying catalyst, the control system comprises an engine control unit for controlling the fuel injection valve and the throttle valve such that a stratus of relatively rich air-fuel mixture is formed around the electrodes of the sparking plug at the time of ignition by spraying the fuel during a compression stroke in a stratified combustion region set in a low engine load region when the engine is warm and the stratus of the rich air-fuel mixture is dispersed in the combustion chamber by spraying the fuel during an intake stroke in a uniform combustion region set in a high engine load region. The starting timing of the fuel injection by the fuel injection valve is advanced within the compression stroke by reducing the amount of intake air. The degree of advancement is set within a range in the stratified combustion can be maintained. The fuel injection valve and the throttle valve are controlled such that the air-fuel ratio in the combustion chamber is larger than a stoichiometric air-fuel ratio when it is confirmed that the temperature of the exhaust gas purifying catalyst is low in accordance with a detection signal of the catalyst temperature sensor in the stratified combustion region when the engine is warm.

With this construction, when the temperature of the exhaust gas purifying catalyst is confirmed to be low in accordance with the detection signal of the catalyst temperature sensor in the stratified combustion region when the engine is warm, the engine control unit executes the control to reduce the amount of intake air in the stratified combustion region, the control to advance the fuel injection starting timing by a specified amount during the compression stroke and the control to set the air-fuel ratio in the entire combustion chamber larger than the stoichiometric air-fuel ratio. This prevents a fall in exhaust gas temperature resulting from an excessive amount of intake air admitted into the combustion chamber, which effectively prevents the exhaust gas purifying catalyst from becoming inactive. This further prevents the air-fuel mixture around the electrodes of the sparking plug to be excessively enriched while maintaining the stratified combustion of the engine, with the result that combustibility can be maintained at a satisfactory level.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A control system for a direct injection engine of spark ignition type which is provided with an exhaust gas purifying catalyst in an exhaust passage, a fuel injection valve for directly spraying fuel into a combustion chamber, a sparking plug having an electrode projecting into the combustion chamber, the control system comprising:

an intake air amount controller for controlling an amount of intake air to be admitted into the combustion chamber; and a fuel injection controller for forming a stratus of relatively rich air-fuel mixture around the electrodes of the sparking plug at the time of ignition by spraying the fuel during a compression stroke in a stratified combustion region set in a low engine load region when the engine is warm while dispersing the stratus of the rich air-fuel mixture in the combustion chamber by spraying the fuel during an intake stroke in a uniform combustion region set in a high engine load region, and advancing the fuel injection starting timing within the compression stroke, and setting the degree of advancement in a range where the stratified combustion of the engine is maintained when the intake air amount controller executes a control to reduce the amount of intake air in the stratified combustion region when the engine is warm.

2. A control system according to claim 1, wherein the fuel injection controller advances the fuel injection starting timing within the second half of the compression stroke when the intake air amount controller executes the control to reduce the amount of intake air at least in an idle operating region of the stratified combustion region when the engine is warm.

3. A control system according to claim 1, wherein the degree by which the amount of intake air is reduced is so controlled as to set an air-fuel ratio in the entire combustion chamber larger than a stoichiometric air-fuel ratio when the intake air amount controller executes the control to reduce the amount of intake air at least in an idle operating region of the stratified combustion region when the engine is warm.

4. A control system according to claim 1, further comprising a catalyst temperature judger for judging whether the temperature of the exhaust gas purifying catalyst is low, wherein the intake air amount controller executes the control to reduce the amount of intake air when the catalyst temperature judger judges that the temperature of the exhaust gas purifying catalyst is low in the stratified combustion region when the engine is warm.

5. A control system according to claim 1, further comprising an operating condition judger for judging whether the engine is in an idle operating condition, wherein the intake air amount controller executes the control to reduce the amount of intake air when the operating condition judger judges that the engine to have continued is in an idle operating condition over a predetermined time in the stratified combustion region when the engine is warm.

6. A control system according to claim 4, further comprising an operating condition judger for judging whether the operating condition of the engine is in a low engine load region, and an outside air temperature detector for detecting an outside air temperature, wherein the intake air amount controller executes a control to start fuel injection during the intake stroke when the operating condition judger judges that the operating condition of the engine lies in a low engine load region and the outside air temperature detector detects the outside air temperature to be low in the stratified combustion region when the engine is warm.

7. A control system according to claim 6, wherein the fuel injection controller starts the fuel injection during the intake stroke and controls the amount of intake air to set an air-fuel ratio in the entire combustion chamber substantially equal to a stoichiometric air-fuel ratio when the operating condition judger judges that the operating condition of the engine lies in a low engine load region and the outside air temperature detector detects the outside air temperature to be low in the stratified combustion region when the engine is warm.

8. A control system for a direct injection engine of spark ignition type which is provided with an exhaust gas purifying catalyst in an exhaust passage, a fuel injection valve for directly spraying fuel into a combustion chamber, a sparking plug having an electrode projecting into the combustion chamber, the control system comprising:

an intake air amount controller for controlling an amount of intake air to be admitted into the combustion chamber;

an operating condition judger for judging whether the engine is in an idle operating condition; and a fuel injection controller for controlling the fuel injection valve to form a stratus of relatively rich air-fuel mixture around the electrodes of the sparking plug at the time of ignition by spraying the fuel during a compression stroke in a stratified combustion region set in a low engine load region when the engine is warm while dispersing the stratus of the rich air-fuel mixture in the combustion chamber by spraying the fuel during an intake stroke in a uniform combustion region set in a high engine load region, wherein the intake air controller executes a control to reduce the amount of intake air, the fuel injection controller executes a control to advance the fuel injection starting timing within the intake stroke and a control to set the degree of advancement in a range where the stratified combustion is maintained, and the degree by which the amount of intake air is reduced is so controlled as to set an air-fuel ratio in the entire combustion chamber larger than a stoichimetric air-fuel ratio when the operating condition judger judges that the engine to have continued is in an idle operating condition over a predetermined time in the stratified combustion region when the engine is warm.

9. A control system for a direct injection engine of spark ignition type which is provided with an exhaust gas purifying catalyst in an exhaust passage, a fuel injection valve for directly spraying fuel into a combustion chamber, a sparking plug having an electrode projecting into the combustion chamber, the control system comprising:

an intake air amount controller for controlling the amount of intake air to be admitted into the combustion chamber;

a catalyst temperature judger for judging whether the temperature of the exhaust gas purifying catalyst is low; and a fuel injection controller for controlling the fuel injection valve to form a stratus of relatively rich air-fuel mixture around the electrodes of the sparking plug at the time of ignition by spraying the fuel during a compression stroke in a stratified combustion region set in a low engine load region when the engine is warm while dispersing the stratus of the rich air-fuel mixture in the combustion chamber by spraying the fuel during an intake stroke in a uniform combustion region set in a high engine load region, wherein the intake air controller executes a control to reduce the amount of intake air; and the fuel injection controller executes a control to advance the fuel injection starting timing within the intake stroke and a control to set the degree of advancement in a range where the stratified combustion is maintained, and an amount by which the amount of intake air is reduced is so controlled as to set an air-fuel ratio in the entire combustion chamber larger than a stoichimetric air-fuel ratio when the catalyst temperature judger judges that the temperature of the exhaust gas purifying catalyst is low in the stratified combustion region when the engine is warm.

10. A control system for a direct injection engine of spark ignition type which is provided with an exhaust gas purifying catalyst in an exhaust passage, a fuel injection valve for directly spraying fuel into a combustion chamber, a sparking plug having an electrode projecting into the combustion chamber, a throttle valve for regulating the amount of intake air to be admitted into the combustion chamber, a crank angle sensor for detecting an engine speed, the control system comprising:

an engine control unit for controlling the fuel injection valve and the throttle valve such that a stratus of relatively rich air-fuel mixture is formed around the electrodes of the sparking plug at the time of ignition by spraying the fuel during a compression stroke in a stratified combustion region set in a low engine load region when the engine is warm and the stratus of the rich air-fuel mixture is dispersed in the combustion chamber by spraying the fuel during an intake stroke in a uniform combustion region set in a high engine load region, wherein the starting timing of the fuel injection by the fuel injection valve is advanced within the compression stroke by reducing the amount of intake air, the degree of advancement is set in a range where the stratified combustion is maintained, and the fuel injection valve and the throttle valve are controlled such that the air-fuel ratio in the combustion chamber is larger than a stoichimetric air-fuel ratio if it is confirmed that the idle operating condition of the engine has been continued over a predetermined time in accordance with a detection signal of the crank angle sensor in the stratified combustion region when the engine is warm.

11. A control system for a direct injection engine of spark ignition type which is provided with an exhaust gas purifying catalyst in an exhaust passage, a fuel injection valve for directly spraying fuel into a combustion chamber, a sparking plug having an electrode projecting into the combustion chamber, a catalyst temperature sensor for detecting a temperature of the exhaust gas purifying catalyst, the control system comprising:

an engine control unit for controlling the fuel injection valve and the throttle valve such that a stratus of relatively rich air-fuel mixture is formed around the electrodes of the sparking plug at the time of ignition by spraying the fuel during a compression stroke in a stratified combustion region set in a low engine load region when the engine is warm and the stratus of the rich air-fuel mixture is dispersed in the combustion chamber by spraying the fuel during an intake stroke in a uniform combustion region set in a high engine load region, wherein the starting timing of the fuel injection by the fuel injection valve is advanced within the compression stroke by reducing the amount of intake air, the degree of advancement is set within a range in the stratified combustion is maintained, and the fuel injection valve and the throttle valve are controlled such that the air-fuel ratio in the combustion chamber is larger than a stoichimetric air-fuel ratio if it is confirmed that the temperature of the exhaust gas purifying catalyst is low in accordance with a detection signal of the catalyst temperature sensor in the stratified combustion region when the engine is warm.

* * * * *